United States Patent
Yokoi et al.

(10) Patent No.: US 8,821,601 B2
(45) Date of Patent: Sep. 2, 2014

(54) HYDROGEN GENERATING ELEMENT, HYDROGEN GENERATION DEVICE, POWER GENERATION DEVICE, AND DRIVING DEVICE

(75) Inventors: Tomokazu Yokoi, Kanagawa (JP); Shuhei Yoshitomi, Kanagawa (JP); Kensuke Yoshizumi, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 134 days.

(21) Appl. No.: 13/345,827

(22) Filed: Jan. 9, 2012

(65) Prior Publication Data
US 2012/0189929 A1    Jul. 26, 2012

(30) Foreign Application Priority Data
Jan. 21, 2011   (JP) ................. 2011-010977

(51) Int. Cl.
  *B01J 7/00*   (2006.01)
  *H01M 8/06*   (2006.01)
  *B01J 19/00*   (2006.01)

(52) U.S. Cl.
  USPC ............. 48/61; 48/127.9; 429/421; 422/162; 123/3; 423/648.1; 423/580.1; 423/657

(58) Field of Classification Search
  USPC ................... 48/61, 127.9, 127.1, 197 R
  See application file for complete search history.

(56) References Cited

U.S. PATENT DOCUMENTS

| | | | |
|---|---|---|---|
| 4,824,652 A | 4/1989 | Hosokawa | |
| 5,643,826 A | 7/1997 | Ohtani et al. | |
| 5,705,829 A | 1/1998 | Miyanaga et al. | |
| 6,165,824 A | 12/2000 | Takano et al. | |
| 6,685,804 B1 | 2/2004 | Ikeda et al. | |
| 6,887,511 B1 | 5/2005 | Shima et al. | |
| 7,015,496 B2 | 3/2006 | Ohnuma et al. | |
| 7,192,673 B1 | 3/2007 | Ikeda et al. | |
| 7,235,330 B1 | 6/2007 | Fujimoto et al. | |

(Continued)

FOREIGN PATENT DOCUMENTS

| JP | 11-281072 | 10/1999 |
|---|---|---|
| JP | 2001-210315 | 8/2001 |

(Continued)

OTHER PUBLICATIONS

Kamins et al., "Ti-catalyzed Si nanowires by chemical vapor deposition: Microscopy and growth mechanisms", Journal of Applied Physics, vol. 89, No. 2, Jan. 15, 2001, pp. 1008-1016.

(Continued)

*Primary Examiner* — Kaity V. Handal
(74) *Attorney, Agent, or Firm* — Nixon Peabody LLP; Jeffrey L. Costellia

(57) ABSTRACT

A hydrogen generating element which can supply hydrogen efficiently and stably, is safe, and has low environmental load is provided. Further, a hydrogen generation device to which the hydrogen generating element is applied is provided. Furthermore, a power generation device and a driving device to each of which the hydrogen generation device is applied are provided. A hydrogen generating element in which a needle-like or dome-like silicon microstructure is formed over a base may be used and reacted with water, whereby hydrogen is efficiently generated. The hydrogen generating element may be applied to a hydrogen generation device. The hydrogen generation device may be applied to a power generation device and a driving device.

25 Claims, 10 Drawing Sheets

(56) References Cited

U.S. PATENT DOCUMENTS

| | | | |
|---|---|---|---|
| 7,241,533 | B1 | 7/2007 | Ikeda et al. |
| 7,396,409 | B2 | 7/2008 | Hatta et al. |
| 7,410,728 | B1 | 8/2008 | Fujimoto et al. |
| 7,658,871 | B2 | 2/2010 | Matsubara et al. |
| 7,794,881 | B1 | 9/2010 | Fujimoto et al. |
| 2002/0168574 | A1 | 11/2002 | Ahn et al. |
| 2004/0079962 | A1* | 4/2004 | Kanechika et al. ........... 257/163 |
| 2005/0042128 | A1 | 2/2005 | Matsubara et al. |
| 2008/0292536 | A1* | 11/2008 | Demuth et al. ............ 423/580.1 |
| 2008/0297981 | A1 | 12/2008 | Endo et al. |
| 2010/0209784 | A1 | 8/2010 | Yamazaki et al. |
| 2011/0008216 | A1* | 1/2011 | Miki et al. .................... 422/162 |
| 2011/0151290 | A1 | 6/2011 | Cui et al. |

FOREIGN PATENT DOCUMENTS

| | | |
|---|---|---|
| JP | 2004-115349 | 4/2004 |
| JP | 2004-281317 | 10/2004 |
| JP | WO 2009/107779 * | 3/2009 |
| WO | WO 2009/107779 * | 3/2009 |

OTHER PUBLICATIONS

Kohno et al., "Silicon Nanoneedles Grown by a Simple Thermal Treatment Using Metal-Sulfur Catalysts", Japanese Journal of Applied Physics, vol. 41, Part 1, No. 2A, Feb. 2002, pp. 577-578.

Cui et al., "Crystalline-Amorphous Core-Shell Silicon Nanowires for High Capacity and High Current Battery Electrodes", Nano Letters, 2009, vol. 9, No. 1, pp. 491-495.

* cited by examiner

HYDROGEN GENERATING ELEMENT, HYDROGEN GENERATION DEVICE, POWER GENERATION DEVICE, AND DRIVING DEVICE

BACKGROUND OF THE INVENTION

1. Field of the Invention

The present invention relates to a hydrogen generating element that generates hydrogen, and a hydrogen generation device to which the hydrogen generating element is applied. The present invention relates to a power generation device using hydrogen and a driving device using hydrogen.

2. Description of the Related Art

In recent years, a variety of techniques utilizing hydrogen have been developed. For example, a fuel battery can generate electricity through chemical reaction between hydrogen and oxygen. In addition, a fuel battery has high power generation efficiency, and its exhaust heat is available (Patent Document 1, Japanese Published Patent Application No. H11-281027).

Hydrogen engines which are driven by directly burning hydrogen have also been developed. A hydrogen engine mainly emits water vapor as an exhaust gas, and thus is less likely to emit such a gas that leads to a greenhouse effect or environmental pollution, unlike a conventional gasoline engine; therefore, practical use of the hydrogen engine as an engine with low environmental load is expected.

As methods for generating hydrogen, for example, a method which utilizes electrolysis of water and a method in which hydrocarbon is modified are known.

REFERENCE

Patent Document

[Patent Document 1] Japanese Published Patent Application No. H11-281072

SUMMARY OF THE INVENTION

However, among methods for generating hydrogen, the method which utilizes electrolysis of water requires much electric energy.

When hydrogen is generated by the method in which hydrocarbon is modified, a greenhouse effect gas such as carbon dioxide is generated. Moreover, since such a method uses a fossil fuel such as petroleum, bioethanol, or the like as hydrocarbon, suppression of environmental load is difficult.

Meanwhile, to supply generated hydrogen, it is considered that high-compression hydrogen is put in a cylinder or the like in a hydrogen filling station or the like. However, high-compression hydrogen has a high risk of explosion or the like and thus has a problem in safety control at the time of storage and transport.

The present invention is made in view of the foregoing technical background. Thus, an object of one embodiment of the present invention is to provide a hydrogen generating element which can supply hydrogen efficiently and stably, is safe, and has low environmental load. Further, an object of one embodiment of the present invention is to provide a hydrogen generation device to which the hydrogen generating element is applied. Furthermore, an object of one embodiment of the present invention is to provide a power generation device and a driving device to each of which the hydrogen generation device is applied.

In order to achieve at least one of the above objects, attention is focused on a phenomenon in which oxidation-reduction reaction between silicon and water generates hydrogen ($H_2$). Hydrogen may be efficiently generated by placing a hydrogen generating element in which a silicon microstructure having large surface area is formed over a metal surface so as to be in contact with water. Further, hydrogen may be stored in a metal silicide layer between the metal surface and the silicon microstructure.

That is, one embodiment of the present invention is a hydrogen generating element that generates hydrogen by being in contact with water. The hydrogen generating element includes a base having a metal surface and a needle-like or dome-like silicon structure over the base, and the silicon structure has a height greater than or equal to 0.1 μm and less than or equal to 1000 μm and a diameter greater than or equal to 30 nm and less than or equal to 10 μm.

According to the above embodiment of the present invention, hydrogen can be generated by reduction of water with silicon; accordingly, hydrogen can be obtained without high energy consumption. Moreover, that reaction produces only silicon oxide as a by-product and does not produce a by-product serving as environmental load, such as a greenhouse effect gas; accordingly, environmental load can be extremely reduced.

The silicon structure has a minute needle-like or dome-like shape and has extremely large surface area. Such large surface area enables efficient generation of hydrogen and increase in material use efficiency without unreacted silicon left. The silicon structure preferably has a height greater than or equal to 0.1 μm and less than or equal to 1000 μm and a diameter greater than or equal to 30 nm and less than or equal to 10 μm. Such a minute silicon structure can be formed by deposition of silicon over a base having a metal surface.

One feature of the silicon structure according to the embodiment of the present invention is that it is formed over a base. If silicon powder is used for the hydrogen generating element, for example, the silicon powder needs to be stirred and dispersed in order to cause reaction efficiently because it aggregates or precipitates in water. Furthermore, collection of a by-product of the reaction requires filtering, centrifugation, or the like. If solid silicon obtained by compressing silicon powder is used for the hydrogen generating element, for example, the ratio of the surface area to the volume is decreased and thus an unreacted portion is left, resulting in decrease in the generation efficiency of hydrogen. By forming the minute silicon structure having large surface area over the base, collection after the reaction is facilitated with sufficient generation efficiency of hydrogen maintained.

One embodiment of the present invention is the hydrogen generating element in which the base has conductivity or thermal conductivity.

According to the above embodiment of the present invention, the base can be heated by being supplied with current or in contact with a heat source; therefore, the base is heated in the case where the amount of generated hydrogen is decreased, whereby the reaction between the silicon structure and water can be enhanced and thus hydrogen can be generated efficiently and stably.

One embodiment of the present invention is the hydrogen generating element which further includes a hydrogen storage layer including a silicide, between the base and the silicon structure.

According to the above embodiment of the present invention, hydrogen generated from the silicon microstructure can be stored in the silicide layer provided between the base and the silicon microstructure. Accordingly, hydrogen can be safely stored and transported. The stored hydrogen can be released when the silicide layer is heated by heating the base, for example.

One embodiment of the present invention is the hydrogen generating element in which the silicide contains either Ti or Ni.

In the case where the silicide contains Ti, silicon microstructures can be densely formed. In the case where the silicide contains Ni, the amount of stored hydrogen can be increased and the stored hydrogen can be released at low temperature.

One embodiment of the present invention is a hydrogen generation device which includes an exterior member having a gas extraction portion and a water introduction portion, and the hydrogen generating element inside the exterior member.

By introduction of water into the hydrogen generation device which includes the hydrogen generating element and the exterior member provided with the gas extraction portion, hydrogen can be extracted from the hydrogen generating element. A hydrogen generation device having such a structure does not generate hydrogen without introduction of water, and thus can be safely stored and transported.

One embodiment of the present invention is a power generation device which includes the hydrogen generation device and a fuel battery. One embodiment of the present invention is a driving device which includes the hydrogen generation device and a hydrogen engine.

Such a hydrogen generation device is connected to a fuel battery, whereby a safe power generation device with low environmental load can be provided. Moreover, combination of such a hydrogen generation device with a hydrogen engine can achieve a driving device with lower environmental load.

Note that in this specification and the like, among silicon microstructures, a needle-like silicon microstructure (including a stick-like silicon microstructure and a branch-like silicon microstructure) is referred to as a needle-like silicon structure. A dome-like silicon microstructure (including a hemispherical silicon microstructure and a columnar silicon microstructure having a hemispherical tip) is referred to as a dome-like silicon structure. Note that these are simply referred to as a silicon structure in some cases.

A hydrogen generating element and a hydrogen generation device which can supply hydrogen efficiently and stably, are safe, and have low environmental load can be provided. Further, a power generation device and a driving device to which the hydrogen generation device is applied and which are safe and have low environmental load can be provided.

DETAILED DESCRIPTION OF THE INVENTION

Figure 1A:
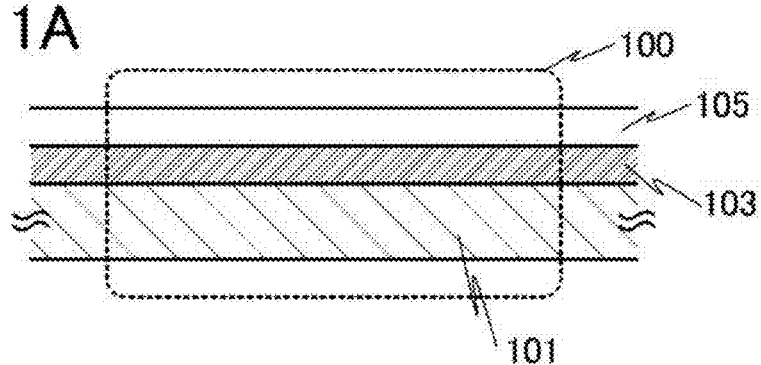
FIGS. 1A to 1C each illustrate a hydrogen generating element according to one embodiment of the present invention.

Embodiments and examples will be described in detail with reference to the drawings. Note that the present invention is not limited to the following description, and it will be easily understood by those skilled in the art that various changes and modifications can be made without departing from the spirit and scope of the present invention. Therefore, the present invention should not be construed as being limited to the description in the following embodiments and examples. Note that in the structures of the invention described below, the same portions or portions having similar functions are denoted by the same reference numerals in different drawings, and description of such portions is not repeated.

Note that in each drawing described in this specification, the size, the layer thickness, or the region of each component is exaggerated for clarity in some cases. Therefore, embodiments of the present invention are not limited to such scales.

Embodiment 1

In this embodiment, an example of a hydrogen generating element including a silicon microstructure, which is one embodiment of the present invention, will be described with reference to FIGS. 1A to 1C.

Basic Structural Example

FIG. 1A schematically illustrates a hydrogen generating element according to one embodiment of the present invention.

A hydrogen generating element 100 includes a silicide layer 103 over and in contact with a base 101 and a silicon structure 105 over and in contact with the silicide layer 103.

The base 101 can be formed using a conductive or thermally conductive material. Further, a material that forms a silicide by reacting with silicon can be used. As examples of the material that forms a silicide, titanium (Ti), nickel (Ni), cobalt (Co), zirconium (Zr), hafnium (Hf), vanadium (V), niobium (Nb), tantalum (Ta), chromium (Cr), molybdenum (Mo), and tungsten (W) can be given.

A flexible base such as a thin metal sheet is preferably used as the base 101 because it can be processed into a desired shape and thus application range of the hydrogen generating element can be expanded. In addition, the base 101 is a material structure body having a surface; the base 101 may have a stick-like shape or a cylinder-like shape as well as a plate-like shape or a sheet-like shape, and the surface may be either flat or curved.

The silicide layer 103 is a layer formed using a silicide containing a material included in the base 101. The composition of the silicide layer 103 is not necessarily uniform; in some cases, the proportion of silicon contained in the silicide layer 103 is higher as the distance from the base 101 gets larger in the thickness direction.

The silicon structure 105 is a needle-like or dome-like microstructure containing silicon (Si) and is formed in contact with the silicide layer 103. The silicon structure 105 is preferably a microstructure having a height greater than or equal to 0.1 μm and less than or equal to 1000 μm and a diameter greater than or equal to 30 nm and less than or equal to 10 μm. Here, the height of a silicon structure means the length of the longest axis of the silicon structure, and the diameter of the silicon structure means the longest diameter of an approximate ellipse of the largest cross section taken perpendicularly to the longest axis of the silicon structure. A silicon microstructure having such a shape has extremely large surface area and thus can have large contact area with water at the time of generation of hydrogen described later; accordingly, hydrogen can be efficiently generated.

The silicon structure 105 may have crystallinity. The silicon structure 105 preferably has crystallinity because the purity can be increased and thus the amount of generated hydrogen per unit volume can be increased.

(Method for Generating Hydrogen)

When the hydrogen generating element 100 is in contact with water, hydrogen can be generated. Specifically, silicon oxide and hydrogen are produced by oxidation-reduction reaction between silicon and water. This reaction can be expressed as the following formula.

$$Si + 2H_2O \Rightarrow SiO_2 + 2H_2 \qquad \text{[FORMULA 1]}$$

Here, in the reaction between silicon and water, the amount of generated hydrogen is increased as the temperature gets higher. In the case of using liquid water, the temperature is preferably higher than or equal to room temperature and lower than 100° C., further preferably higher than or equal to 60° C. and lower than 100° C. Note that water used for the reaction is not necessarily liquid and may be gas (water vapor).

The hydrogen generating element 100 which is one embodiment of the present invention generates hydrogen through the reaction between water and the needle-like or dome-like silicon structure 105 containing silicon. The silicon structure 105 having such a shape can have much larger surface area than a silicon film; therefore, the reaction with water can be enhanced and the amount of generated hydrogen can be increased.

Further, one feature of the hydrogen generating element 100 is that the silicon structure 105 is firmly attached to the base 101 with the silicide layer 103 positioned therebetween. Here, for example, if silicon powder is used as silicon which is to react with water, collection through a filter or the like is needed in order to collect silicon oxide after the reaction. On the other hand, when the hydrogen generating element 100 which is one embodiment of the present invention is used, silicon oxide after the reaction can be easily collected because it is attached to the base 101.

(Method for Storing and Releasing Hydrogen)

By using a material that can store hydrogen for the silicide layer 103, hydrogen generated by the reaction between the silicon structure and water can be stored. For example, the silicide layer 103 can be formed using an interstitial silicide having a hydrogen storage property, such as titanium silicide or nickel silicide.

Hydrogen stored in the silicide layer 103 can be released by a method such as heating or pressure reduction.

As a method for heating the silicide layer 103, use of a heater or the like can be given. Alternatively, the silicide layer 103 may be heated by supplying current to the base 101 having conductivity and utilizing the principle of resistance heating, or the silicide layer 103 may be heated by making the base 101 having thermal conductivity in contact with a heat source. In addition, heating the base 101 by such a method also has an effect of promoting the reaction between silicon and water.

Modification Example

Figure 1B:
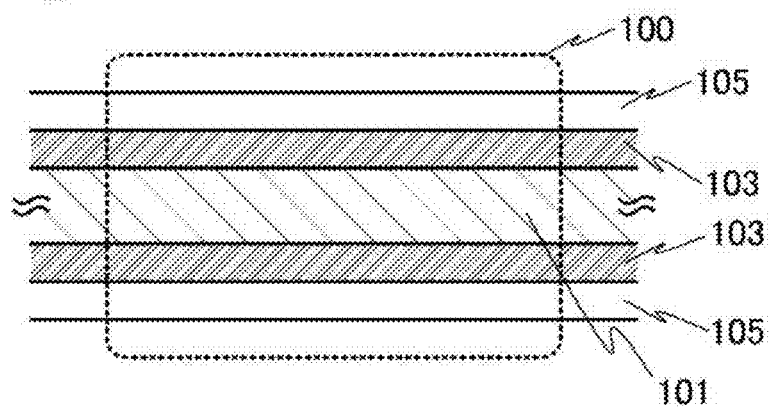

FIG. 1A illustrates the structure in which the silicide layer 103 and the silicon structure 105 are provided on one side of the base 101; the silicide layer 103 and the silicon structure 105 may be provided on both sides of the base 101 as illustrated in FIG. 1B. By providing the silicide layer 103 and the silicon structure 105 on both sides of the base 101, the amount of released hydrogen and the amount of stored hydrogen per unit area of the base 101 can be increased, which is preferable.

Figure 1C:
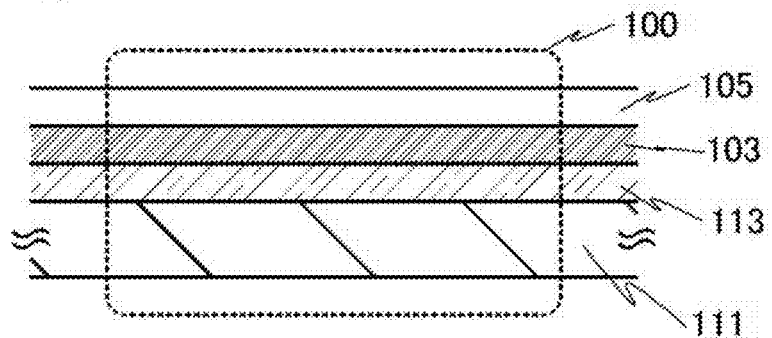

A structure may be employed in which a metal layer 113 containing a material that forms a silicide by reacting with silicon is provided over a base 111 and the silicide layer 103 and the silicon structure 105 are provided with the silicide layer 103 being in contact with the metal layer 113 as illustrated in FIG. 1C. In this case, the base 111 may be formed using any material as long as it can withstand heat treatment in the manufacturing process; for example, a material with high thermal conductivity, a material that generates much heat by heating with current supply, a semiconductor, glass, or plastic can be used.

This embodiment can be combined with any of the other embodiments and examples disclosed in this specification as appropriate.

Embodiment 2

In this embodiment, specific structures of the silicide layer 103 and the silicon structure 105 over the base 101, which can be used for the hydrogen generating element 100 described in Embodiment 1, and a manufacturing method thereof will be described with reference to FIG. 2, FIG. 3, and FIGS. 4A and 4B.

Structural Example 1

Figure 2:
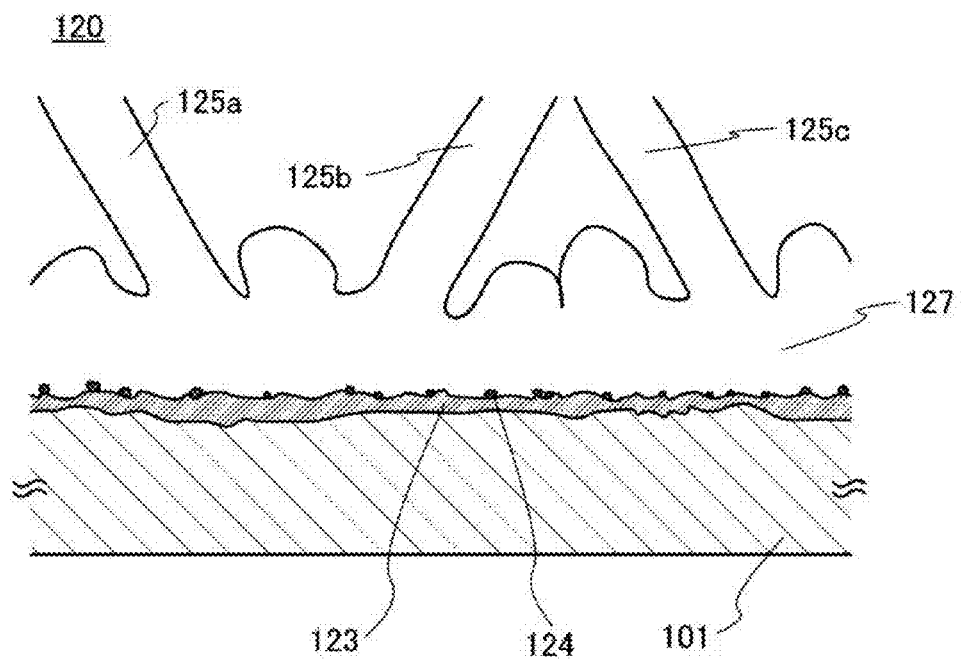
FIG. 2 illustrates a hydrogen generating element according to one embodiment of the present invention.

FIG. 2 is a schematic cross-sectional view of a hydrogen generating element 120 which includes needle-like silicon structures 125a to 125c formed over the base 101.

The hydrogen generating element 120 includes a silicide layer 123 formed in contact with the base 101 and a silicon layer 127 which is over and in contact with the silicide layer 123 and includes the silicon structures 125a to 125c.

As the base 101, a base formed using any of the materials given as examples in Embodiment 1 can be used, and a material with a relatively low diffusion coefficient in silicon is preferably used. With the use of a material with a low diffusion coefficient in silicon, the controllability of the thickness of a silicide layer formed in a deposition step of silicon which is described later can be increased. In this structural example, a metal sheet made of Ti is used as the base 101.

The silicide layer 123 is formed using a silicide obtained by reaction between the metal included in the base 101 and silicon. The composition of the silicide layer 123 is not necessarily uniform; the proportion of contained silicon tends to be higher toward the interface with the silicon layer 127. On the other hand, the silicide included in the silicide layer 123 has lower proportion of silicon toward the base 101, and a metal which is not silicided remains depending on conditions in some cases.

The silicon layer 127 is formed over and in contact with the silicide layer 123, and a plurality of needle-like silicon structures is provided in an upper portion of the silicon layer 127. For clarity, FIG. 2 illustrates only a cross section along the direction of long axes of the needle-like silicon structures 125a to 125c. Here, the boundary between the silicon layer 127 and the needle-like silicon structures 125a to 125c is not clear and thus is not illustrated in the drawing.

The silicon layer 127 and the needle-like silicon structures 125a to 125c have crystallinity. In addition, the needle-like silicon structures 125a to 125c may each have uniaxial alignment in the long-axis direction. In other words, the needle-like silicon structures 125a to 125c each include a plurality of crystalline regions, and each of the crystalline regions has crystal orientation which is substantially aligned with the long-axis direction.

Note that a silicide grain 124 may be provided in the vicinity of the boundary between the silicide layer 123 and the silicon layer 127.

According to a manufacturing process described below, such needle-like silicon structures can be densely formed. The densely formed silicon structures having needle-like shapes can have extremely large surface area; therefore, reaction with water can be enhanced and the amount of generated hydrogen can be increased.

Manufacturing Process Example 1

A method for manufacturing the hydrogen generating element 120 described in Structural Example 1 will be described below.

Silicon is deposited over the base 101 so that the metal included in the base 101 reacts with silicon and a silicide layer is formed. As a deposition method, a variety of deposition methods such as a low-pressure chemical vapor deposition (LPCVD) method and a plasma enhanced chemical vapor deposition (PECVD) method can be used as appropriate. For example, in the case where a PECVD method is used, the RF power source frequency in a range of 13.56 MHz to 2.45 GHz may be used and the substrate temperature, the pressure, the gas flow rate, the RF power, and the like may be adjusted as appropriate so that the metal included in the base 101 reacts with silicon and the silicide layer 123 with a desired thickness is formed.

In this manufacturing process example, silicon is deposited by an LPCVD method. A source gas including a deposition gas containing silicon may be supplied, and the temperature may be set to be higher than 500° C. and lower than or equal to a temperature which a deposition apparatus and the base 101 can withstand, preferably higher than or equal to 580° C. and lower than 650° C.; thus, deposition is performed. Further, the pressure is set to be higher than or equal to the lower limit for keeping supplying the source gas (e.g., higher than or equal to 5 Pa) and lower than or equal to 1000 Pa, preferably higher than or equal to 5 Pa and lower than or equal to 200 Pa.

Examples of the deposition gas containing silicon include a silicon hydride gas, a silicon fluoride gas, and a silicon chloride gas; typically, $SiH_4$, $Si_2H_6$, $SiF_4$, $SiCl_4$, $Si_2Cl_6$, and the like are given. Hydrogen may be introduced into the above gas. A rare gas such as helium, neon, argon, or xenon, or nitrogen may be mixed in the source gas.

Note that the temperature, the pressure, the time, the gas flow rate, and the like in the LPCVD method are adjusted as appropriate so that the metal included in the base 101 reacts with silicon and a silicide is formed. In this manufacturing process example, deposition is conducted under conditions where a mixed gas of $SiH_4$ and nitrogen is used as a source gas, the pressure is set to 20 Pa, and the temperature is kept at 600° C. for one hour.

By the LPCVD method, the metal included in the base 101 reacts with silicon, so that the silicide layer 123 is formed. The thickness of the silicide layer 123 formed here depends on the material included in the base 101; in the case of using Ti for the base, for example, the thickness is greater than or equal to 1 nm and less than 100 nm, preferably greater than or equal to 1 nm and less than or equal to 50 nm. The silicide layer 123 is formed to have a relatively small thickness, whereby silicon structures formed later can have needle-like shapes easily and can be formed densely.

Next, the silicon layer 127 is formed over the silicide layer 123, and the needle-like silicon structures 125a to 125c are formed using, as a nucleus, a projection of a surface of the silicide layer 123 or the silicide grain 124 which is precipitated out on the surface of the silicide layer 123. The smaller the thickness of the silicide layer 123 is, the smaller the size of the projection or the silicide grain 124 serving as a nucleus is, so that a needle-like silicon structure is easily obtained. In addition to the needle-like silicon structures, a projection is formed on the surface of the silicon layer 127 in some cases.

Through the above steps, a large number of needle-like silicon structures can be densely formed over the base 101.

Note that needle-like silicon structures can be formed over the base 111 provided with the metal layer 113 as in FIG. 1C in the following manner: the metal layer 113 is formed over the base 111 by a known deposition method such as a sputtering method, and then silicon is deposited by a method similar to the above. Here, when the thickness of the metal layer 113 is relatively small, silicon structures to be formed can have needle-like shapes easily and can be formed densely.

Structural Example 2

A structural example of a hydrogen generating element 130 including a dome-like silicon structure which has a shape different from that in Structural Example 1, and an example of a manufacturing process of the hydrogen generating element 130 will be described below with reference to FIG. 3.

Figure 3:
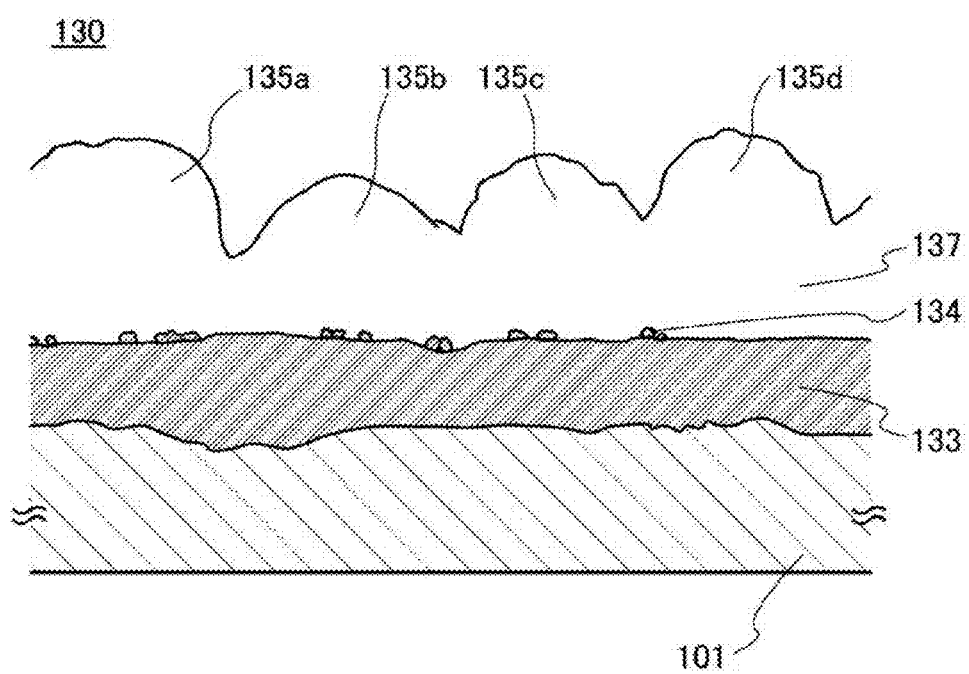
FIG. 3 illustrates a hydrogen generating element according to one embodiment of the present invention.

The hydrogen generating element 130 illustrated in FIG. 3 includes a silicide layer 133 formed in contact with the base 101 and a silicon layer 137 which is over and in contact with the silicide layer 133 and includes silicon structures 135a to 135d.

As the base 101, a base similar to that in Structural Example 1 can be used, and a material with a relatively low diffusion coefficient in silicon is preferably used. With the use of a material with a low diffusion coefficient in silicon, the controllability of the thickness of a silicide layer formed in a deposition step of silicon which is described later can be increased. In this structural example, a metal sheet made of Ti is used as the base.

As in Structural Example 1, the silicide layer 133 is formed using a silicide obtained by reaction between the metal included in the base 101 and silicon. The composition of the silicide layer 133 is not necessarily uniform; the proportion of contained silicon tends to be higher toward the interface with the silicon layer 137.

One feature of the silicide layer 133 is its thickness which is larger than that of the silicide layer 123 described in Structural Example 1. The thickness of the silicide layer 133 depends on a metal element contained therein; in the case of using Ti, for example, the thickness is greater than or equal to 100 nm.

The silicon layer 137 is formed over and in contact with the silicide layer 133, and a plurality of dome-like (also referred to as hemispherical) silicon structures (silicon structures 135a to 135d) is provided in an upper portion of the silicon layer 137. Here, the boundary between the silicon layer 137 and the dome-like silicon structures 135a to 135d is not clear and thus is not illustrated in the drawing.

The silicon layer 137 and the dome-like silicon structures 135a to 135d have crystallinity.

Note that a silicide grain 134 may be provided in the vicinity of the boundary between the silicide layer 133 and the silicon layer 137.

According to a manufacturing process described below, such dome-like silicon structures can be densely formed. The densely formed silicon structures having dome-like shapes can have large surface area; therefore, reaction with water can be enhanced and the amount of generated hydrogen can be increased. Further, the dome-like silicon structure is suitable for higher integration because the height thereof can be smaller than that of a needle-like silicon structure. In addition, since the thickness of the silicide layer can be increased in this structural example, the amount of stored hydrogen can be increased.

Manufacturing Process Example 2

A method for manufacturing the hydrogen generating element 130 described in Structural Example 2 will be described below.

Silicon is deposited over the base 101 by a deposition method similar to that in Manufacturing Process Example 1. In this manufacturing process example, silicon is deposited by an LPCVD method. At this time, deposition conditions are adjusted as appropriate so that the silicide layer 133 which is formed by the reaction between the metal included in the base 101 and silicon can have a desired thickness. In the case of using Ti as the metal included in the base 101, for example, the silicide layer 133 is formed to a thickness greater than or equal to 100 nm. The silicide layer 133 is formed to have a relatively large thickness, whereby silicon structures formed later can have dome-like shapes easily and can be formed densely.

Next, the silicon layer 137 is formed over the silicide layer 133, and the dome-like silicon structures 135a to 135d are formed using, as a nucleus, a projection of a surface of the silicide layer 133 or the silicide grain 134 which is precipitated out on the surface of the silicide layer 133. The larger the thickness of the silicide layer 133 is, the larger the size of the projection or the silicide grain 134 serving as a nucleus is, so that a dome-like silicon structure grows easily. Note that a needle-like silicon structure as well as the dome-like silicon structures exists in some cases, depending on conditions.

Through the above steps, a large number of dome-like silicon structures can be densely formed over the base 101.

Note that dome-like silicon structures can be formed over the base 111 provided with the metal layer 113 as in FIG. 1C in the following manner: the metal layer 113 is formed to have a relatively large thickness, and then silicon is deposited by a method similar to the above.

Structural Example 3

A structural example of a hydrogen generating element 140 including a needle-like silicon structure and a silicide layer which have shapes different from those in the above structural example, and a method for manufacturing the hydrogen generating element 140 will be described with reference to FIGS. 4A and 4B.

Figure 4A:
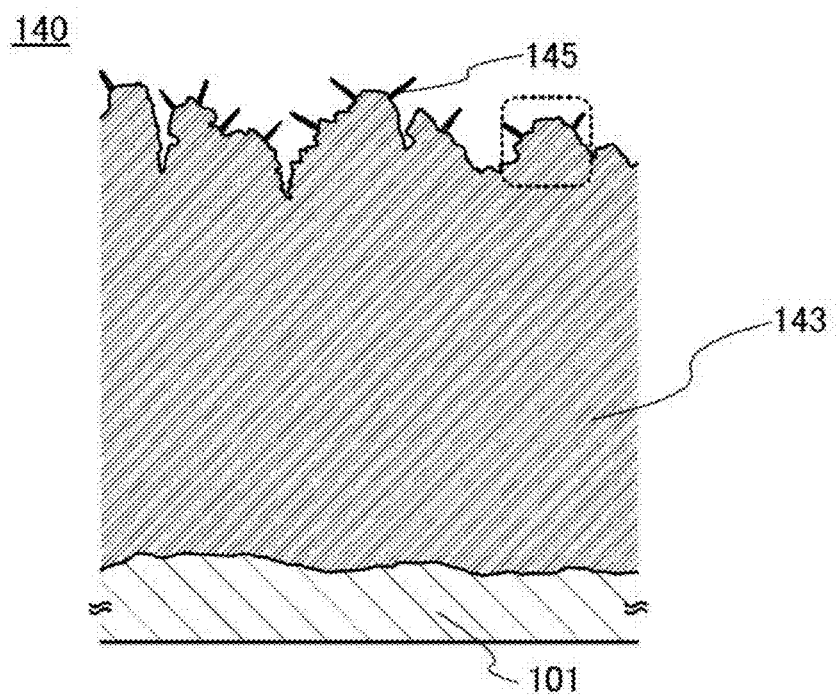
FIGS. 4A and 4B illustrate a hydrogen generating element according to one embodiment of the present invention.
Figure 4B:
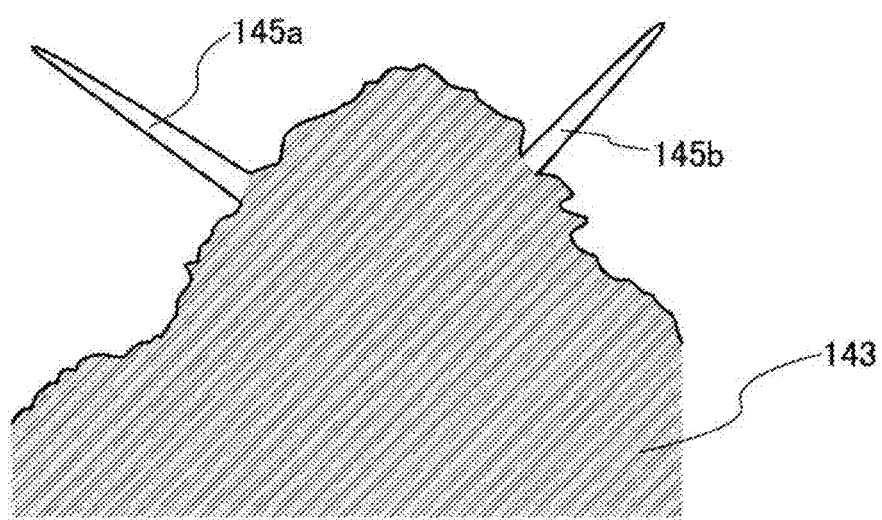

The hydrogen generating element 140 illustrated in FIG. 4A includes a silicide layer 143 formed over and in contact with the base 101 and a plurality of needle-like silicon structures 145 which projects from a surface of the silicide layer 143.

The base 101 can be formed using any of the materials given as examples in Embodiment 1, and a metal material with a relatively high diffusion coefficient in silicon is preferably used. With the use of a material with a high diffusion coefficient in silicon, the thickness of a silicide layer formed in a deposition step of silicon which is described later can be extremely increased. In this structural example, a metal sheet made of Ni is used as the base 101.

The silicide layer 143 is formed using a silicide obtained by reaction between the metal included in the base 101 and silicon. The composition of the silicide layer 143 is not necessarily uniform; the proportion of contained silicon tends to be lower toward the base 101, whereas the proportion of contained silicon tends to be higher toward the surface. Further, the base 101 is formed using a metal material with a high diffusion coefficient in silicon, whereby a silicide is easily formed at the time of deposition of silicon, which is described later, and the silicide layer 143 has a large thickness. The thickness of the silicide layer 143 is approximately several micrometers to several hundreds of micrometers, though it depends on deposition conditions of silicon or the kind of a metal element used for the base 101; in some cases, the silicide layer 143 is formed to be thicker than the base 101.

Further, the silicide layer 143 has a highly uneven surface, and a projection of the surface has a shape like part of an ellipsoid. Furthermore, this projection has a minute uneven surface.

The silicide layer 143 may have crystallinity and, in that case, may have a clear crystal grain boundary. In addition, silicides having partly different compositions aggregate in some cases. In the case of using Ni as the metal included in the base 101, for example, grains may be formed so that the proportion of silicon is increased from a portion close to the base 101 toward the surface of the silicide layer 143. For example, a $Ni_2Si$ region, a $Ni_3Si_2$ region, and a $NiSi$ region may be formed in the region close to the base 101, in a central portion, and in the vicinity of the surface, respectively.

The needle-like silicon structures 145 are formed so as to project from projections of the surface of the silicide layer 143. FIG. 4B is a schematic cross-sectional view in which a region surrounded by a dotted line in FIG. 4A is enlarged. Needle-like silicon structures 145a and 145b are formed to project from a region of a projection of the silicide layer 143, and the long-axis directions thereof are not necessarily aligned with the direction perpendicular to the base 101. In addition, the boundary between the silicide layer 143 and the needle-like silicon structures 145a and 145b does not need to be clear; in the needle-like silicon structures 145a and 145b, a region close to the silicide layer 143 is silicided in some cases.

The needle-like silicon structures 145 may have crystallinity. As for the crystallinity, each of the needle-like silicon structures 145 may have uniaxial alignment in the long-axis direction.

According to a manufacturing process described below, such a silicide layer having a highly uneven surface can be formed and needle-like silicon structures which project from projections of the surface can be formed densely. With the needle-like silicon structures having large surface area, reaction with water can be enhanced and the amount of generated hydrogen can be increased. With the thick silicide layer, the amount of stored hydrogen can also be increased.

Manufacturing Process Example 3

A method for manufacturing the hydrogen generating element 140 described in Structural Example 3 will be described below.

Silicon is deposited over the base 101 by a deposition method similar to that in Manufacturing Process Example 1. In this manufacturing process example, silicon is deposited by an LPCVD method. At this time, the silicide layer 143 is formed by the reaction between the metal included in the base 101 and silicon; a material with a high diffusion coefficient in silicon is used as the material included in the base 101, whereby the thickness of the formed silicide layer 143 becomes extremely large.

Then, the needle-like silicon structures 145 are formed so as to project from regions of projections of the surface of the silicide layer 143.

Through the above steps, a silicide layer having a highly uneven surface can be formed over the base 101 and needle-like silicon structures which project from projections of the surface can be formed densely.

Note that a silicide layer having a highly uneven surface and needle-like silicon structures which project from projections of the surface can be formed over the base 111 provided with the metal layer 113 as in FIG. 1C in the following manner: the metal layer 113 is formed to have a large thickness, and then silicon is deposited by a method similar to the above.

The shape, such as the diameter or the length, of the silicon structure of the hydrogen generating element described in this embodiment can be controlled by a deposition method or a deposition condition of silicon, and thus the shape of the silicon structure can be selected as appropriate in accordance with use application, a desired amount of generated hydrogen, and the like. Moreover, since a flexible metal sheet can be used as the base and it can be processed into a desired shape, the degree of freedom of the shape of the hydrogen generating element or a device in which the hydrogen generating element is used is significantly high.

Note that this embodiment can be combined with any of the other embodiments and examples disclosed in this specification as appropriate.

Embodiment 3

In this embodiment, a structural example of a hydrogen generation device in which any of the hydrogen generating elements described in the above embodiments is used will be described with reference to FIGS. 5A to 5C.

Figure 5A:
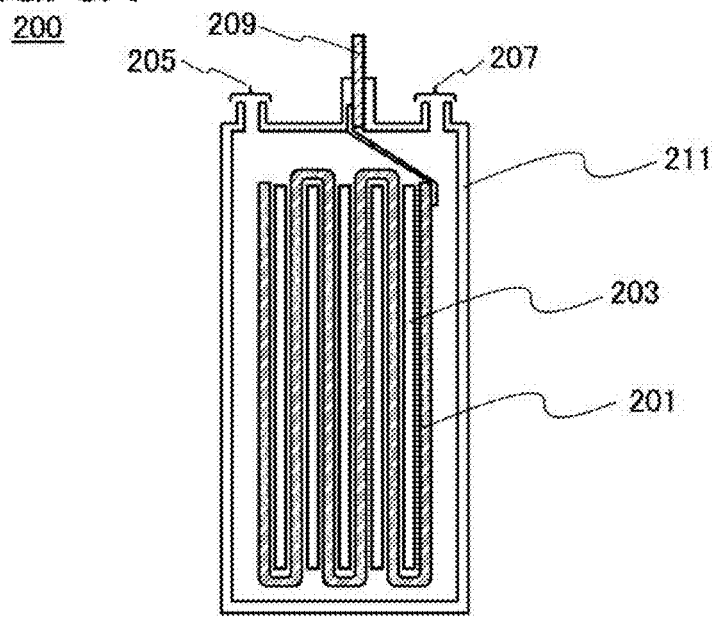
FIGS. 5A to 5C each illustrate a hydrogen generation device according to one embodiment of the present invention.

A hydrogen generation device 200 illustrated in FIG. 5A includes a hydrogen generating element 201 and a separator 203 inside an exterior member 211.

As a material used for the exterior member 211, a material that does not transmit water or a gas such as hydrogen can be used. For example, metal, ceramic, or plastic can be used. Further, the exterior member 211 can have a box-like shape or a bag-like shape with flexibility.

As the hydrogen generating element 201, any of the hydrogen generating elements described in the above embodiments can be used as appropriate.

The hydrogen generating element 201 is folded in the hydrogen generation device 200, and the separator 203 is provided to prevent contact between facing surfaces of the folded hydrogen generating element 201.

The separator 203 is preferably formed using a material that transmits water and hydrogen. For example, a porous ceramic plate may be used.

The hydrogen generation device 200 is provided with a water introduction portion 205 for introduction of water and a gas extraction portion 207 for extraction of a generated hydrogen gas. The water introduction portion 205 may be provided with a check valve for preventing backflow of a hydrogen gas. Alternatively, one element may function as both the water introduction portion 205 and the gas extraction portion 207.

Further, a terminal portion 209 which is electrically or thermally connected to the hydrogen generating element 201 is provided. By supplying current through the terminal portion 209 or by placing a heat source so as to be in contact with the terminal portion 209, the hydrogen generating element 201 can be heated. Note that the terminal portion 209 is not necessarily provided unless needed.

A heater may be provided inside or outside the hydrogen generation device 200 so that water and the hydrogen generating element 201 in the hydrogen generation device 200 are heated.

In the hydrogen generation device 200, hydrogen is not generated unless water is introduced through the water introduction portion 205; therefore, the hydrogen generation device 200 can be extremely safely stored and transported to a place where it is used.

As another mode of the hydrogen generation device, a cartridge-type hydrogen generation device may be employed, in which a hydrogen generating element that generates less hydrogen than before can be replaced.

Figure 5B:
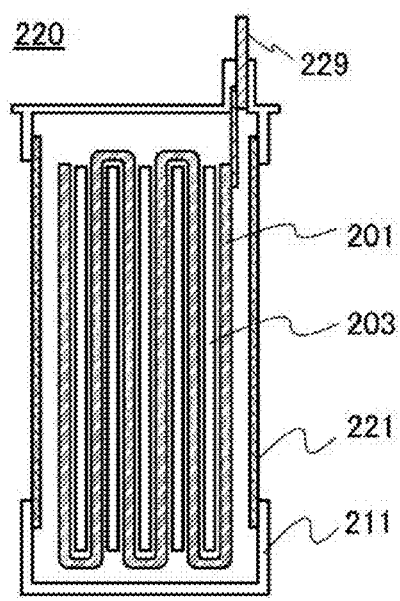

In a cartridge 220 illustrated in FIG. 5B, a filter 221 is provided on a side surface of the exterior member 211.

The filter 221 is formed using a material that transmits water and a hydrogen gas, or has a shape that allows these to be transmitted. Through the filter 221, water is introduced into the cartridge 220 from the outside and hydrogen generated by the hydrogen generating element 201 is released to the outside. In addition, the filter 221 has a function of preventing a foreign substance from moving between the inside and outside of the cartridge 220. As foreign substances inside the cartridge, a silicon structure of the hydrogen generating element 201, an oxide thereof, and the like can be given. Note that the filter 221 is not necessarily provided unless needed, and a structure in which only a slit is provided may be employed. Although the filter is provided on the side surface in this embodiment, a filter may be provided at a bottom portion or at both the side surface and the bottom portion.

In the cartridge 220, a terminal portion 229 which is electrically or thermally connected to the hydrogen generating element 201 is provided.

Figure 5C:
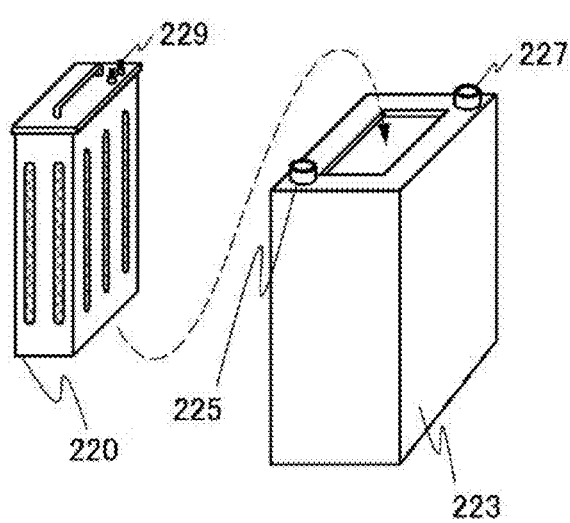

As illustrated in FIG. 5C, the cartridge 220 is loaded into a main body 223 and then used. The main body 223 is provided with a water introduction portion 225 and a gas extraction portion 227.

When the cartridge 220 is loaded into the main body 223, sealing is performed so as to prevent a generated hydrogen gas from leaking through a gap therebetween.

With such a structure, a hydrogen generating element whose hydrogen generating capability is decreased can be easily replaced; accordingly, a desired amount of generated hydrogen can be maintained. Moreover, by collecting a used cartridge and replacing only a hydrogen generating element, the cartridge can be reused, which leads to reduction in environmental load.

This embodiment can be combined with any of the other embodiments and examples disclosed in this specification as appropriate.

Embodiment 4

The hydrogen generating elements and the hydrogen generation devices described in the above embodiments can be applied to a variety of driving devices and power generation devices which utilize hydrogen. Further, the hydrogen generating elements and the hydrogen generation devices can also be applied to transportation means including driving devices or power generation devices which utilize hydrogen, such as vehicles and railways, fuel batteries, systems which utilize exhaust heat of the fuel batteries, and the like.

In this embodiment, application examples of the hydrogen generation device described in Embodiment 3 will be described with reference to FIGS. 6A to 6C.

The hydrogen generation device described in Embodiment 3 can be applied to a power storage device which can generate electricity with the use of hydrogen, such as a fuel battery. Such a power storage device can be used in an electric propulsion vehicle such as an electric vehicle, a hybrid vehicle, a train vehicle, a maintenance vehicle, a cart, or a wheelchair. Such a power storage device can also be applied to a propulsion vehicle such as a vehicle including a driving device like a hydrogen engine, which obtains power by directly burning hydrogen. Here, an electric vehicle and a hydrogen vehicle will be described as typical examples.

Figure 6A:
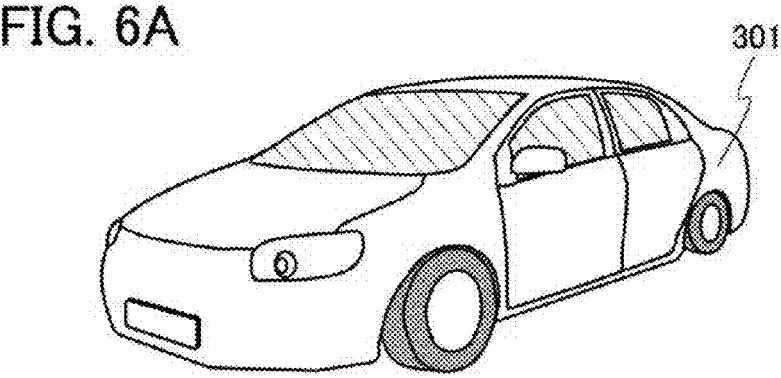
FIGS. 6A to 6C illustrate an electric vehicle and a hydrogen vehicle according to one embodiment of the present invention.
Figure 6B:
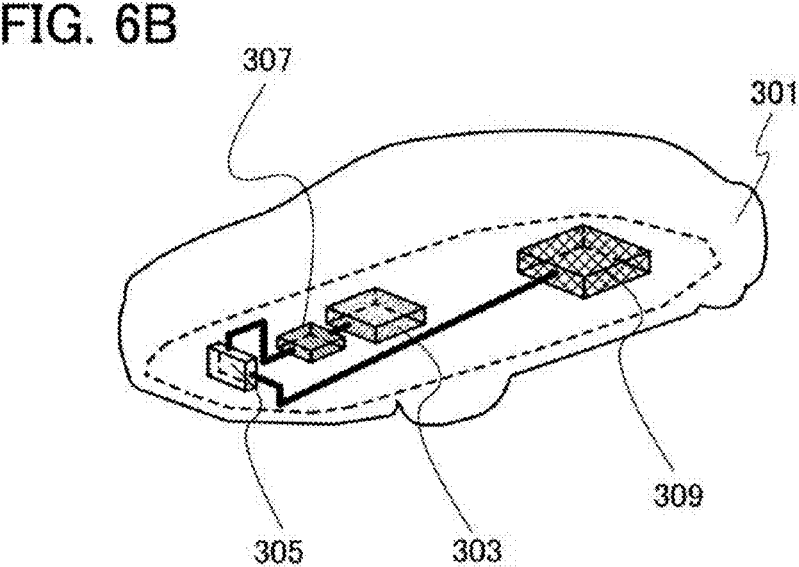

FIG. 6A is a perspective view of an electric vehicle 301. FIG. 6B is a transparent view of the electric vehicle 301 illustrated in FIG. 6A. The electric vehicle 301 obtains power when current flows through a motor 303. The electric vehicle 301 includes a fuel battery 305 for supplying power to feed current to the motor 303, and a power control portion 307.

The electric vehicle 301 further includes a hydrogen generation device 309 according to Embodiment 3, from which hydrogen is supplied to the fuel battery 305. The fuel battery 305 can generate electricity with the use of hydrogen supplied from the hydrogen generation device 309. Note that a battery for storing generated power may be provided between the fuel battery 305 and the control portion 307.

Figure 6C:
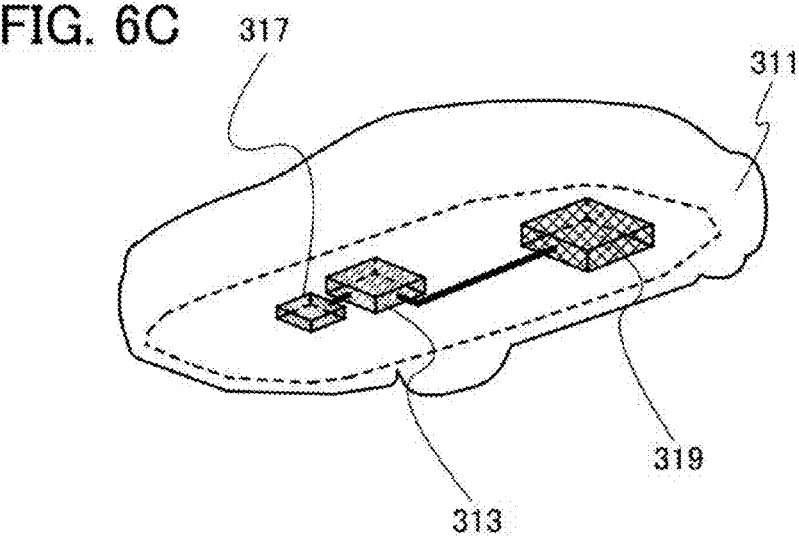

FIG. 6C is a transparent view of a hydrogen vehicle 311. The hydrogen vehicle 311 obtains power by directly burning hydrogen with a hydrogen engine 313. The hydrogen vehicle 311 includes the hydrogen engine 313, a control portion 317 for controlling the operation of the hydrogen engine 313, and a hydrogen generation device 319. Hydrogen from the hydrogen generation device 319 is supplied to the hydrogen engine 313, whereby the hydrogen vehicle 311 can be driven. Note that the hydrogen vehicle 311 may include a fuel battery and a power storage device so that power needed is generated and stored using hydrogen from the hydrogen generation device 319.

Note that this embodiment can be combined with any of the other embodiments and examples in this specification as appropriate.

Example 1

In this example, results of surface SEM observation of a needle-like silicon structure and a dome-like silicon structure which were each formed over a base will be described.

Hereinafter, a sample in which the needle-like silicon structure was formed is referred to as Sample 1, and a sample in which the dome-like silicon structure was formed is referred to as Sample 2.

First, titanium films were formed over glass substrates by a sputtering method. The thickness of the titanium film of Sample 1 was 10 nm, and the thickness of the titanium film of Sample 2 was 300 nm.

Next, a silicon film was formed over each of the samples by an LPCVD method. In film formation, a film formation gas in which $SiH_4$ and $N_2$ were mixed at a ratio of 1:1 was used; the pressure was set to 20 Pa; and the temperature was kept at 600° C. for one hour. Thus, Sample 1 and Sample 2 each including silicon structures were obtained.

Figure 7A:
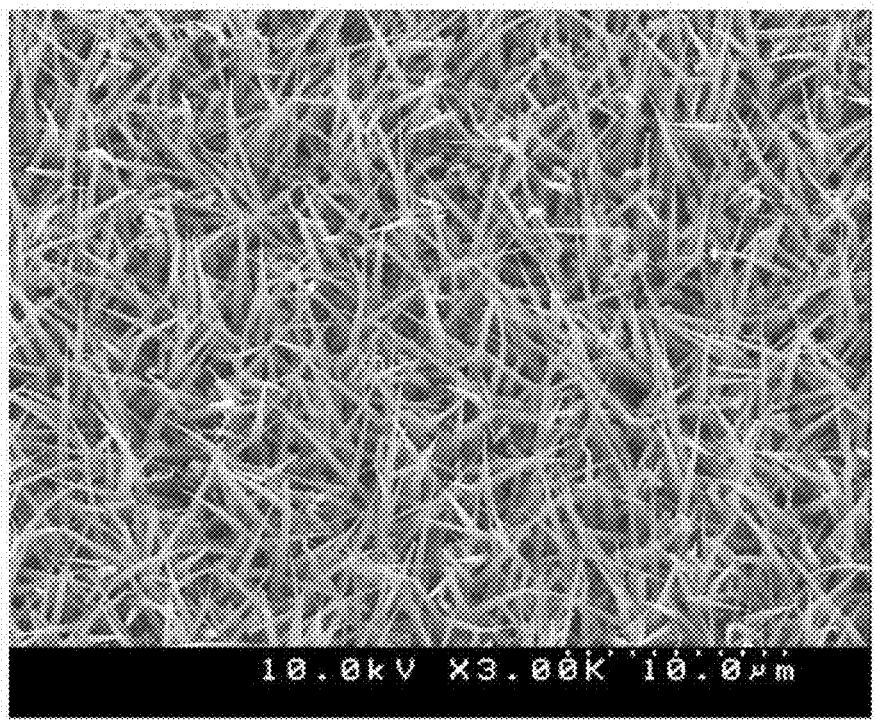
FIGS. 7A and 7B are images observed by SEM according to Example 1.
Figure 7B:
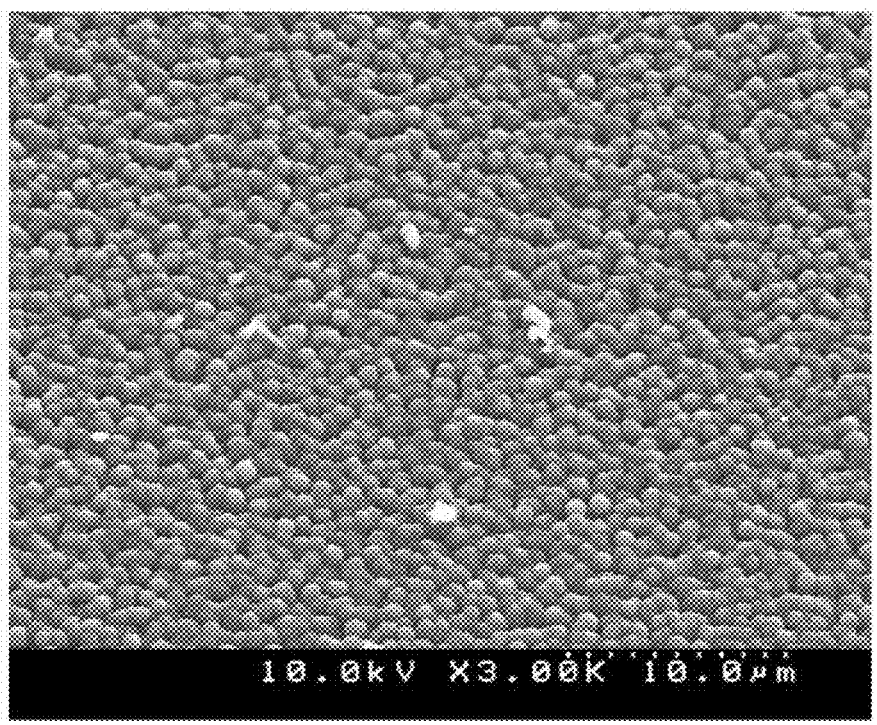

Next, Sample 1 and Sample 2 were observed by scanning electron microscopy (SEM). FIG. 7A is an observation result of Sample 1, and FIG. 7B is an observation result of Sample 2.

In Sample 1, it can be confirmed that needle-like silicon structures were formed at extremely high density. In Sample 2, it can be confirmed that dome-like (hemispherical) silicon structures were formed at extremely high density.

Example 2

In this example, results of surface SEM observation of a needle-like silicon structure which was formed over a base different from the base in Example 1 will be described.

A metal sheet made of Ni (having a discoid shape with a sheet thickness of 0.1 mm and a diameter of approximately 12 mm) was used as a base, and a silicon film was formed thereover by an LPCVD method. In film formation, a film formation gas in which $SiH_4$ and $N_2$ were mixed at a ratio of 1:1 was used; the pressure was set to 20 Pa; and the temperature was kept at 600° C. for 2 hours and 15 minutes. Thus, a base over which needle-like silicon structures were formed (Sample 3) was obtained.

Figure 8A:
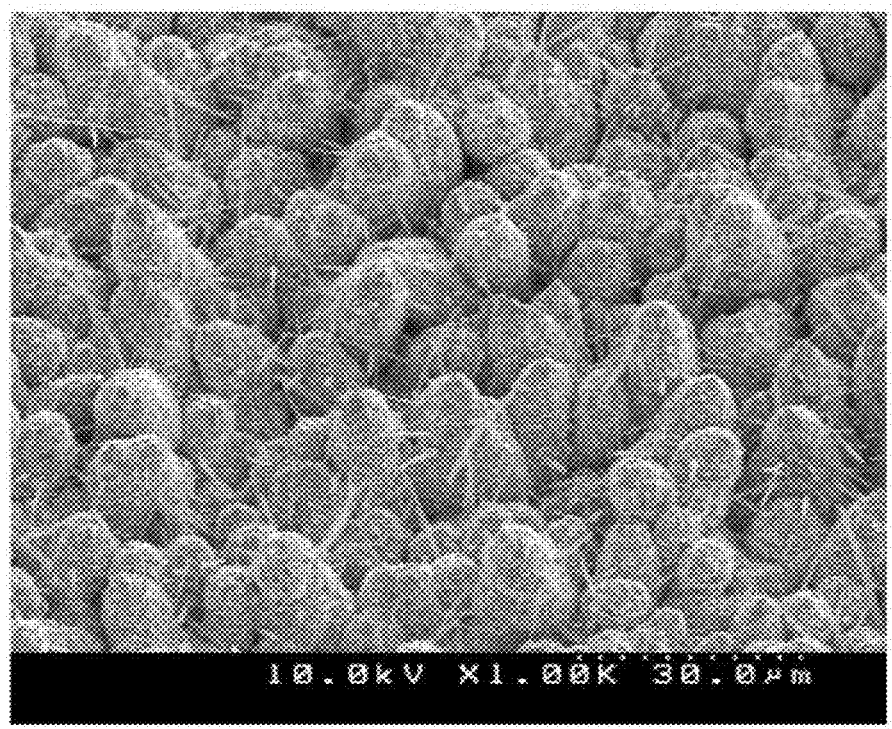
FIGS. 8A and 8B are images observed by SEM according to Example 2.
Figure 8B:
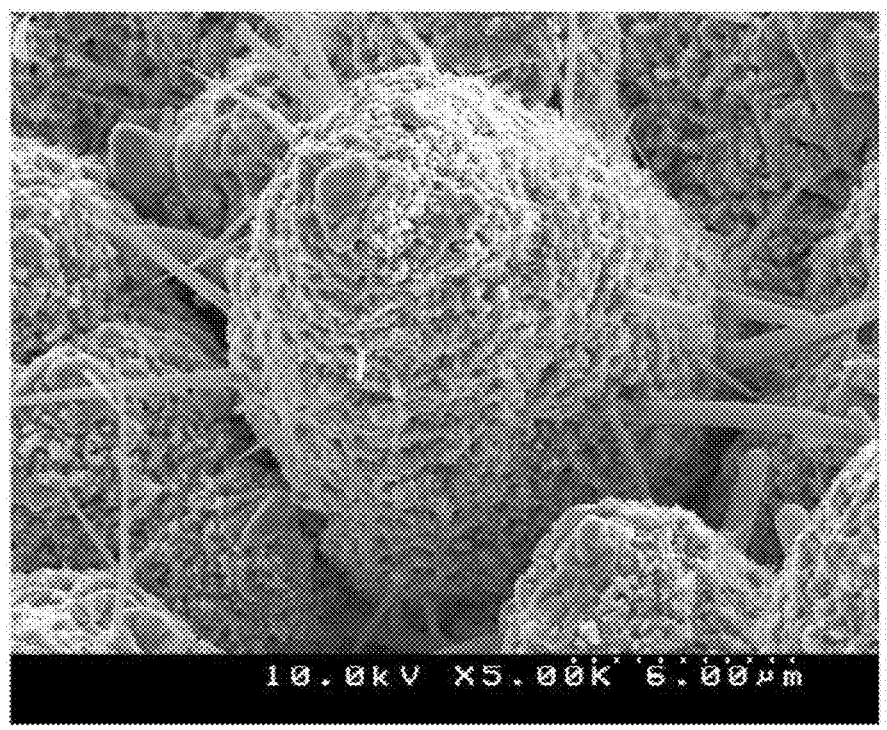

Next, Sample 3 was observed by SEM. FIGS. 8A and 8B show observation results of Sample 3.

From the result in FIG. 8A, it can be confirmed that a silicide layer having a highly uneven surface was densely formed. From the result in FIG. 8B, which is an enlarged view of one projection of the surface, it can be confirmed that needle-like silicon structures projecting from the projection were formed.

Example 3

In this example, the needle-like silicon structure formed in Example 1 was reacted with water and generation of hydrogen was confirmed. Results will be described below.

First, only the needle-like silicon structure in Sample 1 was cut out. After that, the needle-like silicon structure which had been cut out and pure water were mixed in a conical flask.

Then, a beaker was put upside down on the conical flask so that a gas could be collected, and heating was performed using a hot plate at a temperature of 80° C. for approximately 24 hours.

After that, a gas gathered in an upper portion of the beaker was measured using a hydrogen detector manufactured by JIKCO Ltd. (product name: hydrogen leak checker JKC-HY). Hydrogen was detected at the maximum level of the detector, which indicated that hydrogen was contained in the upper portion of the beaker at several parts per million to several thousands of parts per million or higher. From this result, it is confirmed that reaction between the needle-like silicon structure and water was caused and hydrogen was generated.

Example 4

In this example, a silicide layer and a silicon structure were formed over a metal sheet, and TDS measurement was performed before and after the obtained sample was preserved in an atmosphere containing water. Results will be described below.

As a sample in which a needle-like silicon structure was formed over a metal sheet made of Ni, Sample 3 formed in Example 2 was used.

A metal sheet made of Ti (having a discoid shape with a sheet thickness of 0.1 mm and a diameter of approximately 12 mm) was used as a base, and a silicon film was formed by an LPCVD method; thus, Sample 4 which included dome-like silicon structures (including a hemispherical silicon structure and a columnar silicon structure having a hemispherical tip) was formed. In film formation, a film formation gas including $SiH_4$ as a main component was used; the pressure was set to 100 Pa; and the temperature was kept at 600° C. for one hour. Thus, a base over which dome-like silicon structures were formed (Sample 4) was obtained.

Then, thermal desorption spectroscopy (TDS) measurement was performed on Sample 3 and Sample 4 with the use of a thermal desorption spectroscopy apparatus, and $H_2$ and $H_2O$ desorbed from the samples were measured.

Here, a thermal desorption spectroscopy apparatus is used for detecting and identifying, using a quadrupole mass analyzer, a gas component desorbed or generated from a sample when the sample is heated and the temperature thereof is increased in high vacuum; thus, a gas and a molecule desorbed from a surface and an inside of the sample can be observed. Detected gas components are distinguished from each other by the value of M/z (mass/charge). In this example, with the use of a thermal desorption spectroscopy apparatus manufactured by ESCO Ltd. (product name: EMD-WA1000S), measurement was performed under conditions where the temperature rising rate was approximately 30° C./min and the degree of vacuum was approximately $1\times10^{-7}$ Pa.

After that, Sample 3 and Sample 4 were preserved under high-temperature high-humidity environment (temperature: 137° C., humidity: 90%, absolute pressure: 0.299 MPa) for 12 hours.

Next, the samples were taken out, and then $H_2$ and $H_2O$ desorbed from the samples were measured again by TDS measurement using the thermal desorption spectroscopy apparatus; results were compared between before and after the preservation under the high-temperature high-humidity environment.

Figure 9A:
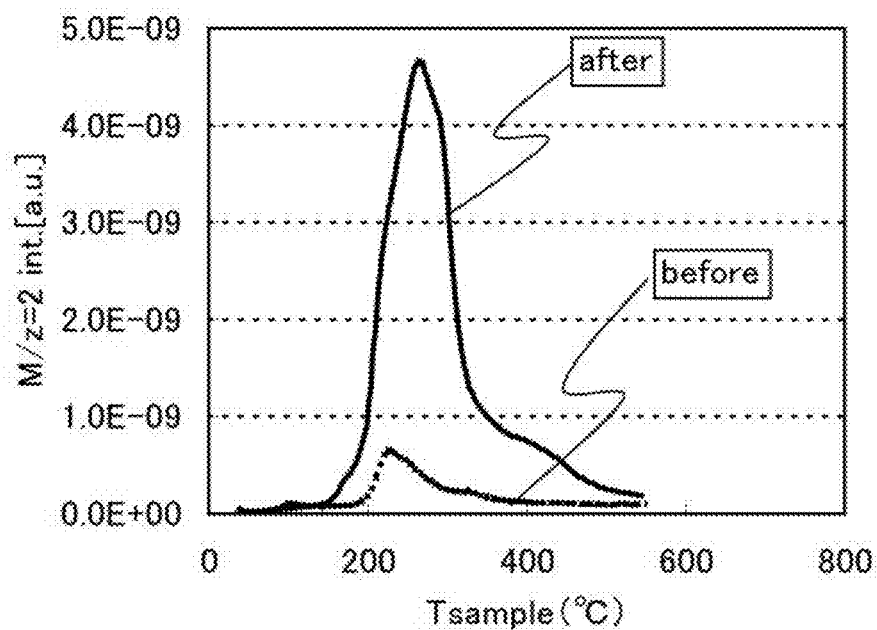
FIGS. 9A and 9B show results of TDS measurement according to Example 4.
Figure 9B:
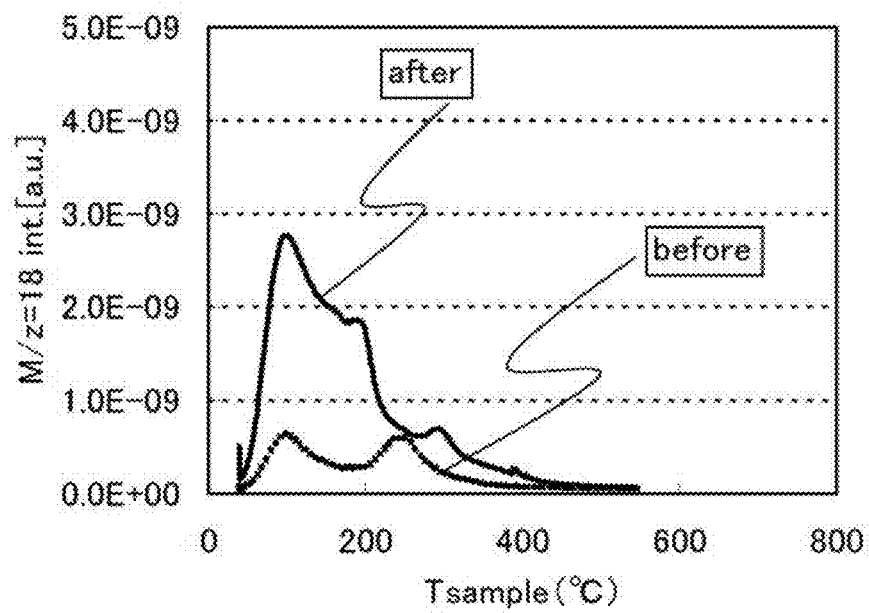

First, results of TDS measurement performed on Sample 3 are shown in FIGS. 9A and 9B. FIG. 9A shows the detection intensity of $H_2$ (M/z=2) desorbed from the sample with respect to the sample temperature. Similarly, FIG. 9B shows the detection intensity of $H_2O$ (M/z=18). In each of the drawings, a solid line represents the sample after the preservation under the high-temperature high-humidity environment, and a dashed line represents the sample before the preservation under the above environment. It is confirmed that by the preservation under the high-temperature high-humidity environment, $H_2O$ was desorbed at a temperature lower than or equal to 200° C. and $H_2$ was desorbed at a temperature higher than or equal to 200° C. and lower than or equal to 400° C. These results indicate that hydrogen can be generated and stored in Sample 3 by preservation under the high-temperature high-humidity environment and that hydrogen can be released from Sample 3 by heating.

Figure 10A:
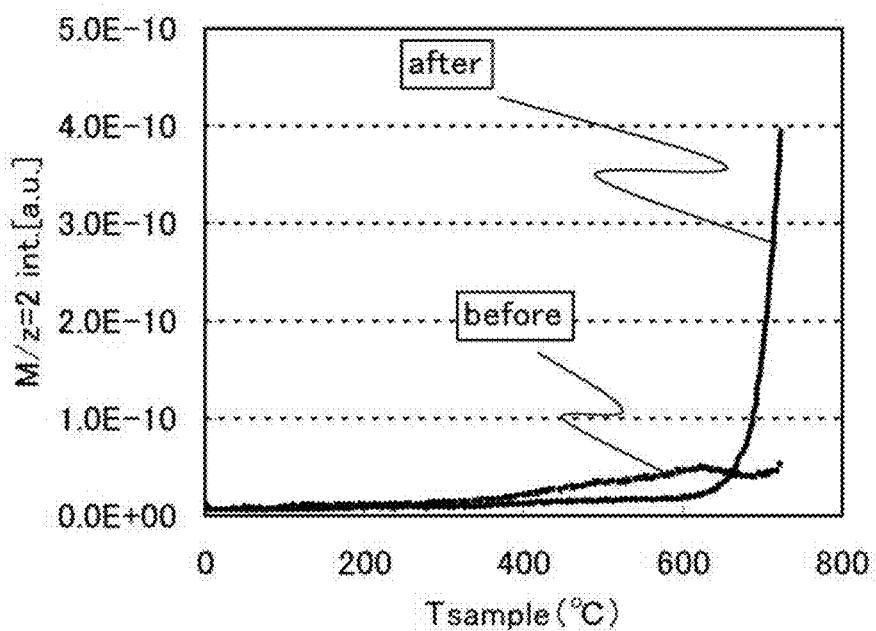
FIGS. 10A and 10B show results of TDS measurement according to Example 4.
Figure 10B:
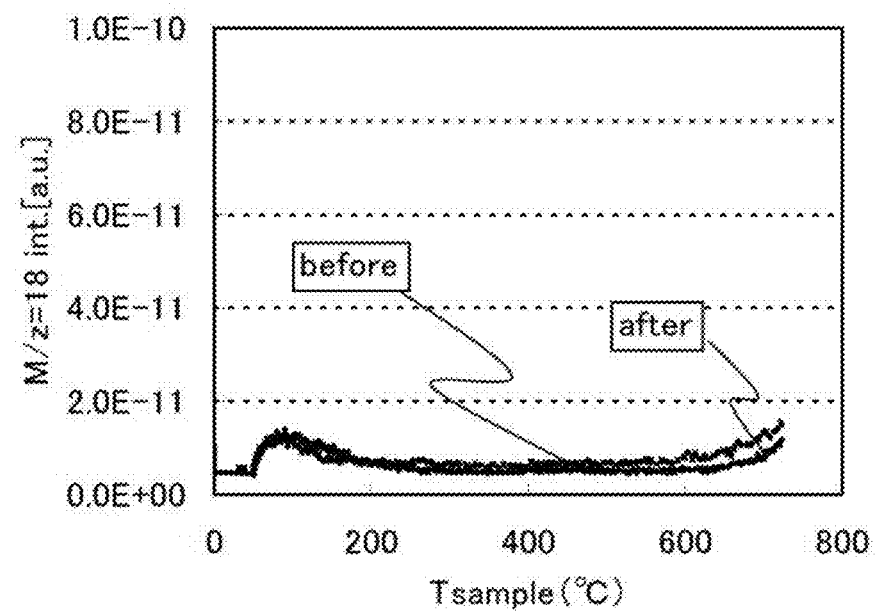

Further, results of TDS measurement performed on Sample 4 are shown in FIGS. 10A and 10B. As in the above, FIGS. 10A and 10B show the detection intensities of $H_2$ and $H_2O$, respectively, with respect to the sample temperature. It is confirmed that $H_2O$ was hardly desorbed from, i.e., hardly stored in Sample 4 even when it was preserved under the high-temperature high-humidity environment. It is also confirmed that $H_2$ was desorbed at a temperature of approximately 700° C. or higher. These results indicate that hydrogen can be generated and stored also in Sample 4 by preservation under the high-temperature high-humidity environment and that hydrogen can be released from Sample 4 by heating.

This application is based on Japanese Patent Application serial no. 2011-010977 filed with the Japan Patent Office on Jan. 21, 2011, the entire contents of which are hereby incorporated by reference.

What is claimed is:

1. A hydrogen generation device comprising:
    a hydrogen generating element comprising:
        a base;
        a silicide layer over the base; and
        a silicon structure over the silicide layer,
    wherein the thickness of the silicide layer is greater than or equal to 1 nm and less than 100 nm, and
    wherein the hydrogen generating element generates hydrogen by being in contact with water.

2. The hydrogen generation device according to claim 1, wherein the silicon structure has a needle-like structure.

3. The hydrogen generation device according to claim 1, wherein the silicon structure has a height greater than or equal to 0.1 μm and less than or equal to 1000 μm and a diameter greater than or equal to 30 nm and less than or equal to 10 μm.

4. The hydrogen generation device according to claim 1, wherein the base has conductivity or thermal conductivity.

5. The hydrogen generation device according to claim 1, further comprising an exterior member comprising a gas extraction portion and a water introduction portion, the exterior member including the hydrogen generating element.

6. A power generation device comprising:
    the hydrogen generation device according to claim 5; and
    a fuel battery.

7. A driving device comprising:
    the hydrogen generation device according to claim 5; and
    a hydrogen engine.

8. A hydrogen generation device comprising:
    a hydrogen generating element comprising:
        a base having a metal surface;
        a silicide layer over the metal surface, the silicide layer including a material of the metal surface; and
        a silicon structure over the silicide layer,
    wherein the thickness of the silicide layer is greater than or equal to 1 nm and less than 100 nm, and
    wherein the hydrogen generating element generates hydrogen by being in contact with water.

9. The hydrogen generation device according to claim 8, wherein the silicon structure has a needle-like structure.

10. The hydrogen generation device according to claim 8, wherein the silicon structure has a height greater than or equal to 0.1 μm and less than or equal to 1000 μm and a diameter greater than or equal to 30 nm and less than or equal to 10 μm.

11. The hydrogen generation device according to claim 8, wherein the base has conductivity or thermal conductivity.

12. The hydrogen generation device according to claim 8, wherein the silicide layer acts as a hydrogen storage layer.

13. The hydrogen generation device according to claim 8, wherein the material comprises either Ti or Ni.

14. The hydrogen generation device according to claim 8, further comprising an exterior member comprising a gas extraction portion and a water introduction portion, the exterior member including the hydrogen generating element.

15. A power generation device comprising:
    the hydrogen generation device according to claim 14; and
    a fuel battery.

16. A driving device comprising:
    the hydrogen generation device according to claim 14; and
    a hydrogen engine.

17. A hydrogen generation device comprising:
    a hydrogen generating element comprising:
        a base;

a metal layer over the base;
a silicide layer over the metal layer, the silicide layer including a material of the metal layer; and
a silicon structure over the silicide layer,
wherein the thickness of the silicide layer is greater than or equal to 1 nm and less than 100 nm, and
wherein the hydrogen generating element generates hydrogen by being in contact with water.

18. The hydrogen generation device according to claim 17, wherein the silicon structure has a needle-like structure.

19. The hydrogen generation device according to claim 17, wherein the silicon structure has a height greater than or equal to 0.1 µm and less than or equal to 1000 µm and a diameter greater than or equal to 30 nm and less than or equal to 10 µm.

20. The hydrogen generation device according to claim 17, wherein the base has conductivity or thermal conductivity.

21. The hydrogen generation device according to claim 17, wherein the silicide layer acts as a hydrogen storage layer.

22. The hydrogen generation device according to claim 17, wherein the material comprises either Ti or Ni.

23. The hydrogen generation device according to claim 17, further comprising an exterior member comprising a gas extraction portion and a water introduction portion, the exterior member including the hydrogen generating element.

24. A power generation device comprising:
the hydrogen generation device according to claim 23; and
a fuel battery.

25. A driving device comprising:
the hydrogen generation device according to claim 23; and
a hydrogen engine.

* * * * *